United States Patent
Zhang (10) Patent No.: US 10,498,879 B2
(45) Date of Patent: Dec. 3, 2019

(54) ELECTRONIC DEVICE, PROTECTION METHOD AND RELATED PRODUCT

(71) Applicant: GUANGDONG OPPO MOBILE TELECOMMUNICATIONS CORP., LTD., Dongguan, Guangdong (CN)

(72) Inventor: Haiping Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/174,054

(22) Filed: Oct. 29, 2018

(65) Prior Publication Data

US 2019/0222688 A1 Jul. 18, 2019

(30) Foreign Application Priority Data

Jan. 18, 2018 (CN) .......................... 2018 1 0052056

(51) Int. Cl.
*H04M 1/725* (2006.01)

(52) U.S. Cl.
CPC .... *H04M 1/72563* (2013.01); *H04M 2250/12* (2013.01)

(58) Field of Classification Search
CPC .................. H04M 1/72563; H04M 2250/12
USPC .......................................................... 455/557
See application file for complete search history.

(56) References Cited

U.S. PATENT DOCUMENTS

| | | | |
|---|---|---|---|
| 8,872,448 B2 | 10/2014 | Boldyrev | |
| 10,043,610 B2 | 8/2018 | Sirimamilla et al. | |
| 2009/0279874 A1* | 11/2009 | Okada | G11B 19/043 386/222 |
| 2013/0226754 A1 | 8/2013 | Boldyrev | |
| 2013/0257582 A1 | 10/2013 | Rothkopf | |
| 2013/0285490 A1 | 10/2013 | Rothkopf | |
| 2014/0253284 A1 | 9/2014 | Peterson et al. | |
| 2016/0105747 A1* | 4/2016 | Cheng | H04R 5/04 381/309 |
| 2016/0154439 A1 | 6/2016 | Rothkopf et al. | |
| 2016/0344440 A1 | 11/2016 | Peterson et al. | |

(Continued)

FOREIGN PATENT DOCUMENTS

| | | |
|---|---|---|
| CN | 103955365 A | 7/2014 |
| CN | 204271364 U | 4/2015 |

(Continued)

OTHER PUBLICATIONS

International Search Report in international application No. PCT/CN2018/111508, dated Jan. 29, 2019.

(Continued)

*Primary Examiner* — Inder P Mehra
(74) *Attorney, Agent, or Firm* — Ladas & Parry, LLP (57) ABSTRACT

Disclosed are an electronic device, a protection method and a related product. The electronic device includes a sensor, a processor, a vibration motor and a headset jack. The sensor is configured to monitor whether the electronic device falls or not. The processor is configured to, in the case that the electronic device falls, determine whether the headset jack is connected with a headset plug or not. The vibration motor is configured to, in the case that the headset jack is connected with the headset plug, execute a vibration operation to rotate the electronic device by a target angle.

18 Claims, 5 Drawing Sheets

(56) References Cited

U.S. PATENT DOCUMENTS

| | | |
|---|---|---|
| 2016/0379743 A1 | 12/2016 | Sirimamilla et al. |
| 2017/0245383 A1 | 8/2017 | Feng |
| 2017/0317707 A1 | 11/2017 | Peterson et al. |
| 2018/0167100 A1 | 6/2018 | Peterson et al. |

FOREIGN PATENT DOCUMENTS

| | | |
|---|---|---|
| CN | 105472919 A | 4/2016 |
| CN | 105812510 A | 7/2016 |
| CN | 105827847 A | 8/2016 |
| CN | 105912143 A | 8/2016 |
| CN | 106228094 A | 12/2016 |
| CN | 106371630 A | 2/2017 |
| CN | 106375582 A | 2/2017 |
| CN | 107302631 A | 10/2017 |
| CN | 108307055 A | 7/2018 |
| JP | 2006304031 A | 11/2006 |

OTHER PUBLICATIONS

English Translation of the Written Opinion of the International Search Authority in international application No. PCT/CN2018/111508, dated Jan. 29, 2019.

Supplementary European Search Report and search opinion in the European application No. 18203485.0, dated Apr. 17, 2019.

First Office Action and Search Report from CN app. No. 201810052056.X, dated Jun. 4, 2019, with English translation from Global Dossier.

Notification to Grant Patent Right for Invention and Supplementary Search Report from CN app. No. 201810052056.X, dated Jul. 30, 2019, with English translation from Global Dossier.

\* cited by examiner

FIG. 1

Headset jack

ELECTRONIC DEVICE, PROTECTION METHOD AND RELATED PRODUCT

CROSS-REFERENCE TO RELATED APPLICATIONS

The present application is based upon and claims priority to Chinese Patent Application No. 201810052056.X, filed on Jan. 18, 2018, the contents of which are hereby incorporated by reference in its entirety.

BACKGROUND

Along with development of a mobile terminal technology, mobile terminals play more and more important roles in people's life. It is more and more convenient to use a mobile terminal for activities of payment, work or the like in life.

However, when a user holds and operates a mobile terminal, the mobile terminal is very likely to fall, thereby damaging a screen, a camera, a button or the like. Therefore, how to prevent a mobile terminal from falling and getting damaged becomes a problem urgent to be solved.

SUMMARY

The application relates to mobile terminals, and more particularly to an electronic device, a protection method and a related product.

According to a first aspect, an electronic device is provided, including a sensor, a processor, a vibration motor and a headset jack. The sensor is configured to monitor whether the electronic device falls or not. The processor is configured to, in the case that the electronic device falls, determine whether the headset jack is connected with a headset plug or not. The vibration motor is configured to, in the case that the headset jack is connected with the headset plug, execute a vibration operation to rotate the electronic device by a target angle.

According to a second aspect, a protection method is provided, which may be applied to an electronic device including a sensor, a processor, a vibration motor and a headset jack. It is monitored whether the electronic device falls or not. In the case that the electronic device falls, whether the headset jack is connected with a headset plug or not is determined. In the case that the headset jack is connected with the headset plug, the vibration motor is controlled to execute a vibration operation to rotate the electronic device by a target angle.

According to a third aspect, a protection device is provided, which may be applied to an electronic device including a sensor, a processor, a vibration motor and a headset jack. The protection device includes a monitoring unit, a determination unit and a control unit. The monitoring unit is configured to monitor whether the electronic device falls or not. The determination unit is configured to, in the case that the electronic device falls, determine whether the headset jack is connected with a headset plug or not. The control unit is configured to, in the case that the headset jack is connected with the headset plug, control the vibration motor to execute a vibration operation to rotate the electronic device by a target angle.

According to a fourth aspect, an electronic device is provided, including a processor, a memory, a communication interface and one or more programs. The one or more programs may be stored in the memory and may be configured to be executed by the processor. The programs may include instructions configured to execute the steps in any method according to the second aspect of the embodiments of the application.

According to a fifth aspect, a computer-readable storage medium is provided. The computer-readable storage medium may store a computer program which enables a computer to execute part or all of the steps described in any method according to the second aspect of the embodiments of the application.

According to a sixth aspect, a computer program product is provided. The computer program product includes a non-transitory computer-readable storage medium storing a computer program. The computer program may be operated to enable a computer to execute part or all of the steps described in any method according to the second aspect of the embodiments of the application. The computer program product may be a software installation package.

BRIEF DESCRIPTION OF DRAWINGS

In order to describe the technical solutions in the embodiments of the application more clearly, the drawings required to be used in descriptions about the embodiments will be briefly introduced below. It is apparent that the drawings described below are only some embodiments of the application. Other drawings may further be obtained by those of ordinary skill in the art according to these drawings without creative work.

DETAILED DESCRIPTION

In order to make purposes, technical solutions and advantages of the application clearer, the application will further be described below in combination with the drawings in detail. It is apparent that the described embodiments are not all embodiments but only part of embodiments of the application. All other embodiments obtained by those of ordinary skill in the art on the basis of the embodiments in the application without creative work shall fall within the scope of protection of the application.

Terms "first", "second" or the like in the specification, claims and drawings of the application are adopted not to describe a specific sequence but to distinguish different objects. In addition, terms "include" and "have" and any transformations thereof are intended to cover nonexclusive inclusions. For example, a process, method, system, product or device including a series of steps or units is not limited to the steps or units which have been listed but optionally further includes steps or units which are not listed or optionally further includes other steps or units intrinsic to the process, the method or the device.

"Embodiment" mentioned in the invention means that a specific feature, structure or characteristic described in combination with an embodiment may be included in at least one embodiment of the application. Each position where this phrase appears in the specification does not always refer to the same embodiment as well as an independent or alternative embodiment mutually exclusive to another embodiment. It is explicitly and implicitly understood by those skilled in the art that the embodiments described in the invention may be combined with other embodiments.

An electronic device involved in the embodiments of the application may include various handheld devices, vehicle-mounted devices, wearable devices, computing devices or other processing devices connected to wireless modems, which have a wireless communication function, as well as User Equipment (UE), Mobile Stations (MSs), terminal devices or the like in various forms. For convenient description, the devices mentioned above are collectively referred to as electronic devices.

The embodiments of the application provide an electronic device, a protection method and a related product. The electronic device rotates by a target angle when falling in the case that a headset jack of the electronic device is connected with a headset plug to avoid the headset jack to the ground, thereby preventing the headset jack of the electronic device from being damaged because of falling. Detailed descriptions will be made below respectively.

Figure 1:
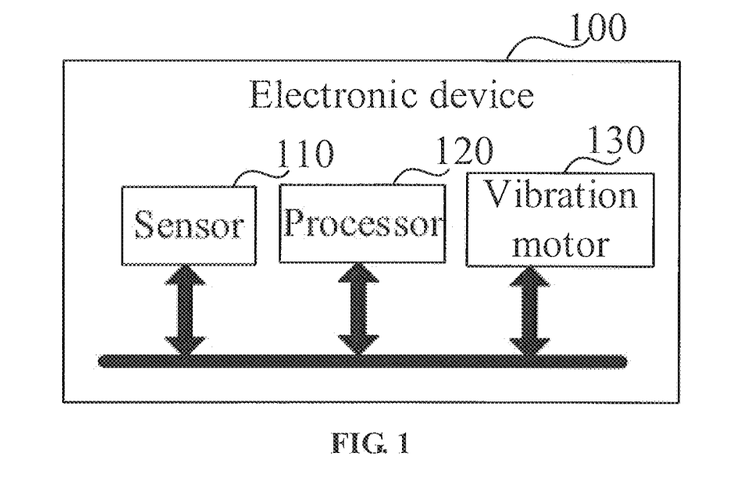
FIG. 1 is a structure diagram of an electronic device according to an embodiment of the application.

Referring to FIG. 1, FIG. 1 is a structure diagram of an electronic device 100 according to an embodiment of the application. The electronic device 100 includes a sensor 110, a processor 120 and a vibration motor 130. The sensor 110, the processor 120 and the vibration motor 130 may be connected through a bus, thereby communicating with one another.

In the embodiment of the application, the electronic device 100 further includes a headset jack, configured to connect a wired headset for audio output. The wired headset includes a headset plug. When the electronic device 100 is connected with the wired headset, the headset jack is connected with the headset plug.

Figure 2:
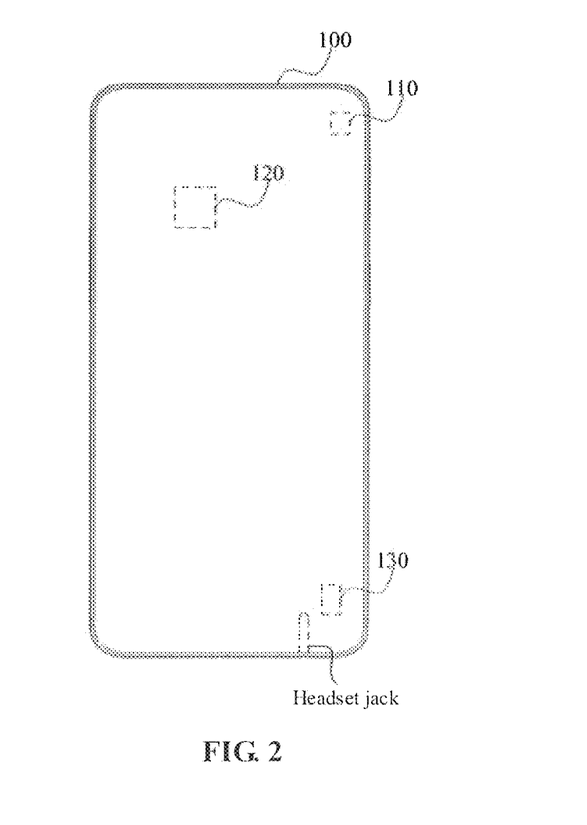
FIG. 2 is a structure diagram of another electronic device according to an embodiment of the application.

Referring to FIG. 2, FIG. 2 is a structure diagram of another electronic device 100 according to an embodiment of the application. In FIG. 2, an example of a position distribution of the sensor 110, the processor 120 and the vibration motor 130 on the electronic device 100 is shown, and an example of a position of the headset jack is also shown.

Figure 3:
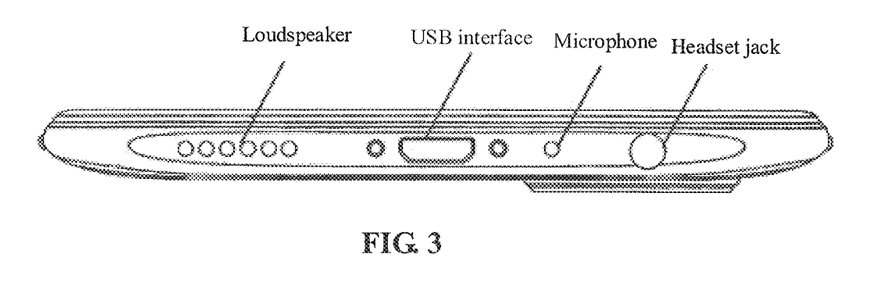
FIG. 3 is a side view of an electronic device according to an embodiment of the application.

Furthermore, referring to FIG. 3, FIG. 3 is a side view of an electronic device 100 according to an embodiment of the application. In FIG. 3, an example of a position distribution of the headset jack on a lateral surface of the electronic device is shown. It can be understood that a functional component such as a loudspeaker, a microphone and a Universal Serial Bus (USB) interface may also be distributed on the lateral surface.

In the embodiment of the application, the sensor 110 is configured to monitor whether the electronic device 100 falls or not.

The processor 120 is configured to, in the case that the electronic device 100 falls, determine whether the headset jack is connected with the headset plug or not.

The vibration motor 130 is configured to, in the case that the headset jack is connected with the headset plug, execute a vibration operation to rotate the electronic device 100 by a target angle.

The sensor 110 may be a gravity sensor, an acceleration sensor or a gyroscope. The specific sensor to be adopted is not limited in the embodiment of the application. The processor 120 may be a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. The vibration motor 130 may be an eccentric vibration motor, a linear vibration motor or the like.

In the implementation mode, the electronic device may rotate by the target angle when the electronic device falls in the case that the headset jack of the electronic device is connected with the headset plug to avoid the headset jack to the ground, thereby preventing the headset jack of the electronic device from being damaged because of falling.

Furthermore, the processor 120 is further configured to estimate a falling angle when the electronic device 100 falls to the ground and determine whether the headset plug is a contact point when the electronic device 100 falls to the ground or not according to the falling angle.

In executing the vibration operation to rotate the electronic device 100 by the target angle, the vibration motor 130 is configured to, in the case that the headset plug is the contact point, execute the vibration operation to rotate the electronic device 100 by the target angle. Furthermore, the processor 120 may calculate the target angle according to the falling angle. The target angle may be an angle range. After the electronic device 100 rotates by the target angle, the contact point at which the electronic device contacts with the ground is not the headset plug but another region of the electronic device. When the vibration motor 130 executes the vibration operation, a rotating angle of the electronic device is only required to fall within the angle range.

Specifically, the contact point is a region, contacting with the ground, of the electronic device 100 when the electronic device 100 falls to the ground. As an example, the sensor 110 acquires acceleration information of the electronic device 100 in a falling process. The acceleration information includes an acceleration direction. The processor 120 may estimate the falling angle when the electronic device falls to the ground according to the acceleration direction. The falling angle may be an included angle between a side edge of the electronic device and a vertical/horizontal direction. It may be determined whether the headset plug is the contact point or not according to the falling angle.

Figure 4:
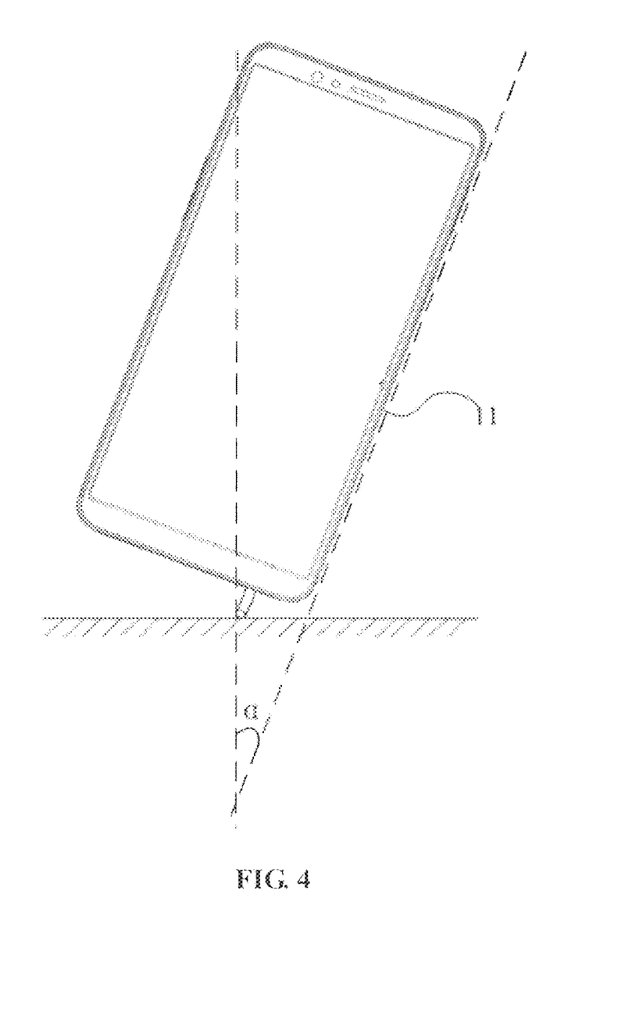
FIG. 4 is a schematic diagram of a falling angle according to an embodiment of the application.

For elaborating the falling angle more clearly, referring to FIG. 4, FIG. 4 is a schematic diagram of a falling angle according to an embodiment of the application. In FIG. 4, a falling angle $\alpha$ is an included angle between a side edge 11 and the vertical direction when the electronic device 100 contacts with the ground. With the angle, an inclination angle of the electronic device 100 at a falling moment may be obtained and it may be estimated whether a camera 110 is the contact point or not according to the inclination angle. It is to be noted that the ground is a general term of an object/position which the electronic device contacts with when falling. It can be understood that the electronic device may fall to various objects such as a tabletop, a stone and a sofa. The various non-exhaustive objects and positions are collectively referred to as ground.

In the implementation mode, in the case that the processor determines that the headset plug is the contact point, for avoiding the headset plug falling to be bent and also avoiding the headset jack being damaged because of falling, the vibration motor 130 may execute the vibration operation to rotate the electronic device 100 by the target angle to make the headset plug not be the contact point, thereby avoiding damage to the headset plug and the headset jack.

As an example, in monitoring whether the electronic device 100 falls or not, the sensor 110 is configured to: monitor whether the electronic device 100 is in a weightless state or not; and in the case that time for which the electronic device 100 is in the weightless state exceeds a preset threshold value, determine that the electronic device 100 falls.

Figure 5:
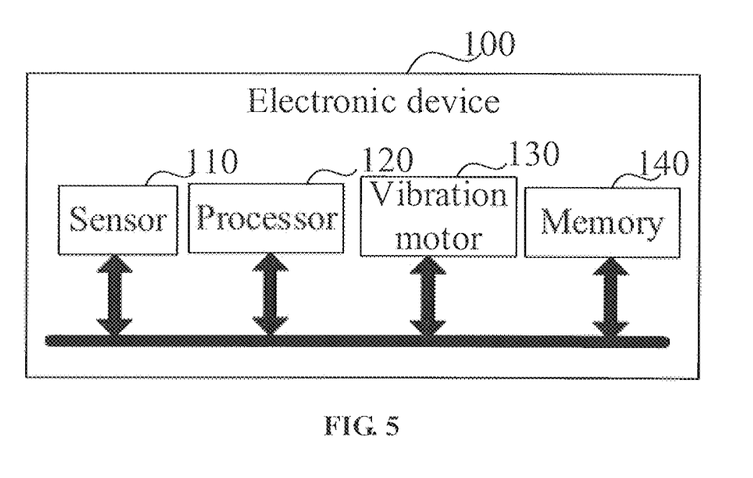
FIG. 5 is a structure diagram of another electronic device according to an embodiment of the application.

In another example, referring to FIG. 5, FIG. 5 is a structure diagram of another electronic device 100 according to an embodiment of the application. As shown in FIG. 5, the electronic device 100 further includes a memory 140.

In the implementation mode, the memory 140 is configured to store related data about falling of this time. For example, the memory 140 may store the estimated falling angle, estimated by the processor 120, of the electronic device 100 and an actual falling angle of the electronic device 100. The memory 140 may also feed back the data to the processor 120. The processor 120 may determine whether the target angle for rotation of the electronic device in this falling process is effective or not according to the estimated falling angle and the actual falling angle and implement correction and reference according to the data during calculation of the target angle in the future. In addition, the actual falling angle of the electronic device 100 may further provide a reference for subsequent maintenance of the electronic device 100.

Figure 6:
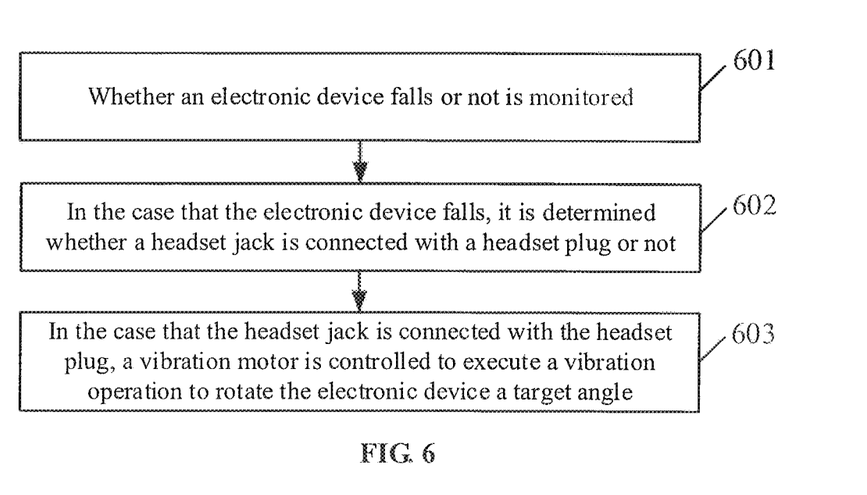
FIG. 6 is a flowchart of a protection method according to an embodiment of the application.

Referring to FIG. 6, FIG. 6 is a flowchart of a protection method according to an embodiment of the application. The protection method may be applied to an electronic device including a sensor, a processor, a vibration motor and a headset jack. The method may include the following operations.

In 601, it is monitored whether the electronic device falls or not.

In the embodiment of the application, the electronic device may determine whether the device falls or not via the sensor. Specifically, the sensor monitors whether the electronic device is in a weightless state or not. In the case that time for which the electronic device is in the weightless state exceeds a preset threshold value, it is determined that the electronic device falls.

As an example, the sensor may be a gravity sensor, an acceleration sensor or a gyroscope.

In 602, in the case that the electronic device falls, it is determined whether the headset jack is connected with a headset plug or not.

In the embodiment of the application, when the electronic device is connected with a wired headset, the headset jack of the electronic device is connected with the headset plug of the wired headset for audio output through the wired headset. When the electronic device falls, it is likely to cause the headset plug to fall to be bent and damage the headset jack. Therefore, in the case that the headset jack of the electronic device is connected with the headset plug, it is necessary to take a certain measure to prevent the headset plug from contacting with the ground when falling.

In 603, in the case that the headset jack is connected with the headset plug, the vibration motor is controlled to execute a vibration operation to rotate the electronic device by a target angle.

In the embodiment of the application, in the case that the headset jack is connected with the headset plug, the electronic device controls the vibration motor to execute the vibration operation to rotate the electronic device by the target angle. After the electronic device rotates by the target angle, the headset plug may not contact with the ground when falling.

Specifically, before the electronic device falls to the ground, a falling angle when the electronic device falls to the ground may be estimated and it is determined whether the headset plug is a contact point when the electronic device falls to the ground or not according to the falling angle.

If it is judged that the headset plug is the contact point, a target angle value by which the electronic device is required to rotate is calculated. Then the vibration motor is controlled to vibrate to rotate the electronic device by the target angle. After rotation of the target angle, other region of the electronic device contacts with the ground, and the headset plug may not contact with the ground.

Specifically, the electronic device may acquire acceleration information and position information of the electronic device relative to a horizontal plane in a falling process and calculate the falling angle according to the acceleration information and the position information.

Thus it can be seen that, with the protection method described in FIG. 6, the electronic device may rotate by the target angle when falling in the case that the headset jack of the electronic device is connected with the headset plug to avoid the headset jack to the ground and further prevent the headset jack of the electronic device from being damaged because of falling.

Figure 7:
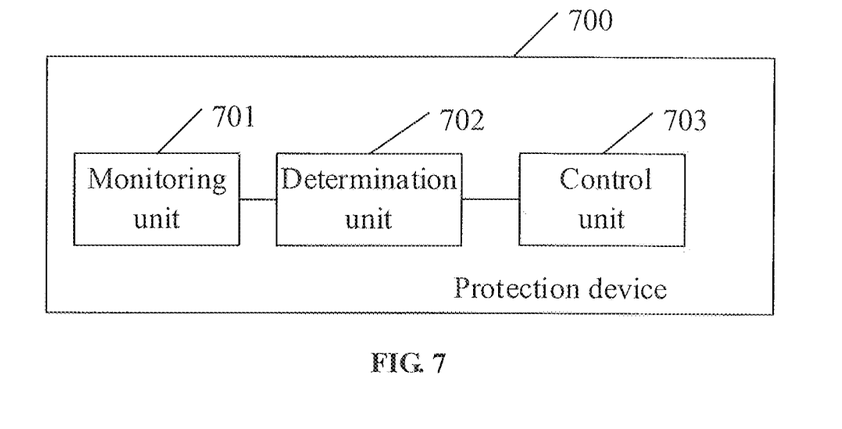
FIG. 7 is a functional structure block diagram of a protection device according to an embodiment of the application.

Referring to FIG. 7, FIG. 7 is a functional structure block diagram of a protection device according to an embodiment of the application. The protection device may be applied to an electronic device including a sensor, a processor, a vibration motor and a headset jack. The protection device 700 includes a monitoring unit 701, a determination unit 702 and a control unit 703.

The monitoring unit 701 is configured to monitor whether the electronic device falls or not.

The determination unit 702 is configured to, in the case that the electronic device falls, determine whether the headset jack is connected with a headset plug or not.

The control unit 703 is configured to, in the case that the headset jack is connected with the headset plug, control the vibration motor to execute a vibration operation to rotate the electronic device by a target angle.

It can be understood that, for realizing the functions, the protection device includes hardware structures and/or software modules executing respective functions. Those skilled in the art may easily realize that the units and algorithm steps of each example described in combination with the embodiments disclosed in the invention may be implemented by hardware or a combination of the hardware and computer software in the disclosure. Whether a certain function is executed by the hardware or in a manner of driving the hardware by the computer software depends on specific applications and design constraints of the technical solutions. Professionals may realize that the described functions for each specific application are implemented by use of different methods, but such implementation shall fall within the scope of the application.

According to the embodiment of the application, functional units of the protection device may be divided according to the abovementioned method example. For example, each of functional units may be divided correspondingly to each function and two or more than two functions may also be integrated into a processing unit. The integrated unit may be implemented in a hardware form and may also be implemented in form of software functional unit. It is to be noted that division of the units in the embodiment of the application is schematic and only logical function division and another division manner may be adopted during practical implementation.

As an example, each of the determination unit 702 and the control unit 703 may be a CPU, a universal processor, a DSP, an ASIC, an FPGA or another programmable logical device, transistor logical device, hardware component or any combination thereof. The monitoring unit 701 may be a gravity sensor, an acceleration sensor and/or a gyroscope or any combination thereof.

Thus it can be seen that, with the protection device 700 described in FIG. 7, the electronic device may rotate by the target angle when falling in the case that the headset jack of the electronic device is connected with the headset plug to avoid the headset jack to the ground and further prevent the headset jack of the electronic device from being damaged because of falling.

Figure 8:
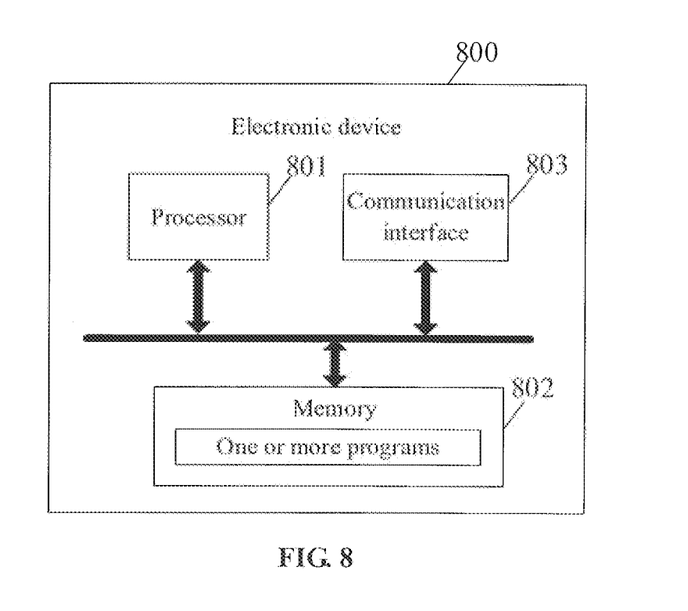
FIG. 8 is a structure diagram of another electronic device according to an embodiment of the application.

Referring to FIG. 8, FIG. 8 is a structure diagram of another electronic device 800 according to an embodiment of the application. The electronic device 800 includes a processor 801, a memory 802, a communication interface 804 and one or more programs. The electronic device 800 further includes a sensor, a vibration motor and a headset jack. The one or more programs are stored in the memory 802 and are configured to be executed by the processor 801. The programs include instructions configured to execute the following operations of: monitoring whether the electronic device falls or not; in the case that the electronic device falls, determining whether the headset jack is connected with a headset plug or not; and in the case that the headset jack is connected with the headset plug, controlling the vibration motor to execute a vibration operation to rotate the electronic device by a target angle.

As an example, the programs further include instructions configured to execute the following operations of: estimating a falling angle when the electronic device falls to the ground; and determining whether the headset plug is a contact point when the electronic device falls to the ground or not according to the falling angle.

In controlling the vibration motor to execute the vibration operation to rotate the electronic device by the target angle, the programs include instructions configured to execute the following operation of: in the case that the headset plug is the contact point, controlling the vibration motor to execute the vibration operation to rotate the electronic device by the target angle.

As an example, the programs further include instructions configured to execute the following operation of acquiring acceleration information of the electronic device in a falling process.

In estimating the falling angle when the electronic device falls to the ground, the programs include instructions configured to execute the following operation of calculating the falling angle according to the acceleration information.

As an example, in monitoring whether the electronic device falls or not, the programs include instructions configured to execute the following operations of: monitoring whether the electronic device is in a weightless state or not; and in the case that time for which the electronic device is in the weightless state exceeds a preset threshold value, determining that the electronic device falls.

As an example, the programs further include instructions configured to execute the following operation of: before controlling the vibration motor to execute the vibration operation, calculating the target angle according to the falling angle, the contact point being not the headset plug in the case that the electronic device rotates by the target angle.

Thus it can be seen that, with the electronic device described in FIG. 8, the electronic device may rotate by the target angle when falling in the case that the headset jack of the electronic device is connected with the headset plug to avoid the headset jack to the ground and further prevent the headset jack of the electronic device from being damaged because of falling.

Figure 9:
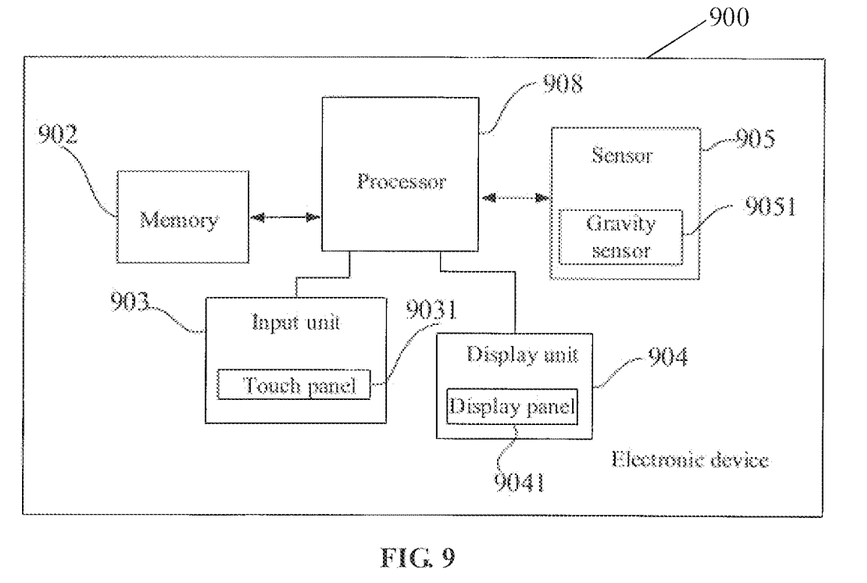
FIG. 9 is a structure diagram of another electronic device according to an embodiment of the application.

Referring to FIG. 9, FIG. 9 is a structure diagram of another electronic device 900 according to an embodiment of the application. As shown in FIG. 9, for purpose of convenient description, only parts related to the embodiment of the application are shown, and specific technical details which are undisclosed refer to parts of the method of the embodiments of the application. The electronic device may be any terminal device including a mobile phone, a tablet computer, a Personal Digital Assistant (PDA), a Point of Sales (POS), a vehicle-mounted computer or the like. For example, the electronic device is a mobile phone.

FIG. 9 is a block diagram of part of a structure of a mobile phone related to an electronic device according to an embodiment of the application. Referring to FIG. 9, the mobile phone includes components such as a memory 902, an input unit 903, a display unit 904, a sensor 905 and a processor 908. Those skilled in the art should know that the structure of the mobile phone shown in FIG. 9 is not intended to limit the mobile phone and instead may include components more or fewer than those shown in the figure. Some components are combined or different component arrangements are adopted.

Each component of the mobile phone will be specifically introduced below in combination with FIG. 9.

The memory 902 may be configured to store a software program and a module. The processor 908 operates the software program and module stored in the memory 902, thereby executing various function applications and data processing of the mobile phone. The memory 902 may mainly include a program storage region and a data storage region. The program storage region may store an operating system, an application program required by at least one function (for example, a sound playing function and an image playing function) or the like. The data storage region may store data (for example, audio data and a phone book) created according to use of the mobile phone or the like. In addition, the memory 902 may include a high-speed Random Access Memory (RAM), and may further include a non-volatile memory, for example, at least one disk storage device, flash memory device or other volatile solid-state storage device. In the embodiment of the application, the memory 902 may be configured to store related data about falling of this time. For example, the memory 902 may store an estimated falling angle, estimated by the processor 908, of the electronic device 900 and an actual falling angle of the electronic device 900.

The input unit 903 may be configured to receive input digital or character information and generate key signal input related to user setting and function control of the mobile phone. Specifically, the input unit 903 may include a touch panel 9031. The touch panel 9031, also called a touch screen, may collect a touch operation of a user thereon or nearby (for example, an operation executed by the user with any proper object or accessory such as a finger and a stylus on the touch panel 9031 or nearby the touch panel 9031) and drive a corresponding connection device according to a preset program. Optionally, the touch panel 9031 may include two parts, i.e., a touch detection device and a touch controller. The touch detection device detects a touch direction of the user, detects a signal generated by the touch operation and transmits the signal to the touch controller. The touch controller receives touch information from the touch detection device, converts it into a touch point coordinate and transmits it to the processor 908, and may receive and execute a command sent by the processor 908. In addition, various types such as resistive, capacitive, infrared and surface acoustic wave may be adopted for the touch panel 9031.

The display unit 904 may be configured to display information input by the user or information provided for the user and various menus of the mobile phone. The display unit 904 may include a display panel 9041. Optionally, the display panel 9041 may be configured in form of Liquid Crystal Display (LCD) and Organic Light-Emitting Diode (OLED). Furthermore, the display panel 9041 may be covered by the touch panel 9031. After detecting the touch operation thereon or nearby, the touch panel 9031 transmits it to the processor 908 to determine a type of a touch event. Then, the processor 908 provides corresponding visual output on the display panel 9041 according to the type of the touch event. In FIG. 9, the touch panel 9031 and the display panel 9041 realize input and output functions of the mobile phone as two independent components. However, in some embodiments, the touch panel 9031 and the display panel 9041 may be integrated to realize the input and output functions of the mobile phone. In the embodiment of the application, the display panel 9041 may be configured to output prompting information to prompt the user to check whether the headset plug and the headset jack are damaged or not.

The mobile phone may further include at least one sensor 905, for example, a light sensor, a motion sensor and another sensor. Specifically, the light sensor may include an environmental light sensor and a proximity sensor. The environmental light sensor may regulate brightness of the display panel 9041 according to brightness of environmental light, and the proximity sensor may turn off the display panel 9041 and/or backlight when the mobile phone is moved to an ear. As a motion sensor, an accelerometer sensor may detect a magnitude of an acceleration in each direction (usually three axes), may detect a magnitude and direction of the gravity in a still state, and may be configured for an application recognizing a posture of the mobile phone (for example, landscape and portrait switching, a related game and magnetometer posture calibration), a vibration recognition related function or the like (for example, a pedometer and knocking). Other sensors, for example, a gyroscope, a barometer, a hygrometer, a thermometer and an infrared sensor, which may be configured in the mobile phone, will not be elaborated herein. In the embodiment of the application, the sensor 905 includes a gravity sensor 9051. The gravity sensor 9051 may be configured to determine whether the electronic device 900 falls or not.

Specifically, the gravity sensor 9051 is configured to detect a direction and magnitude of acceleration, equivalent to detection of a motion state of the mobile phone, mainly senses a change in the acceleration, for example, various movement changes such as shake, falling, ascending and descending, and then converts acceleration data into an electric signal. Then, a designed function of the program may be realized after calculation and analysis of a microprocessor. On the smart phone, the gravity sensor 9051 may work independently and may also cooperate with a geomagnetic sensor and a gyroscope to provide a more accurate and comprehensive motion sensing capability.

Figure 10:
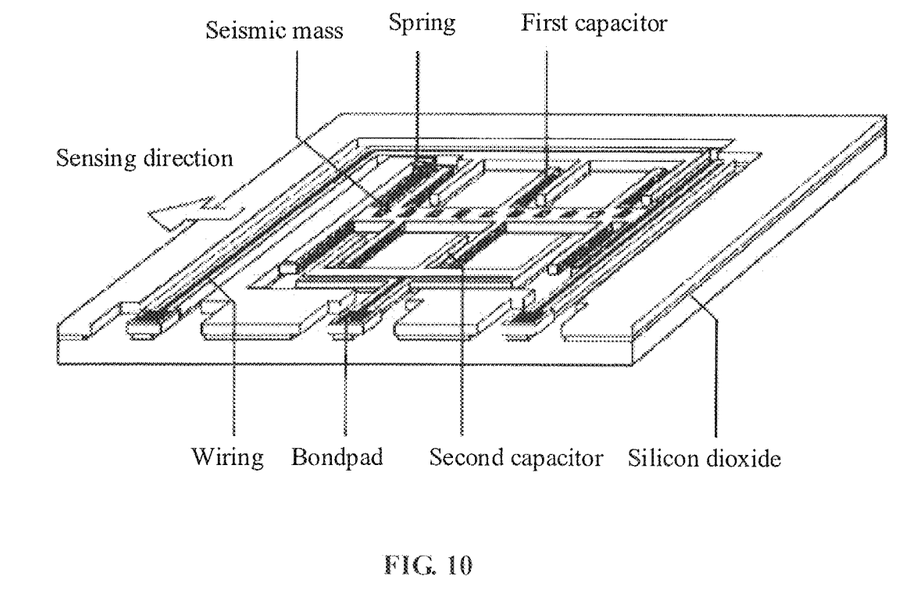
FIG. 10 is a structure diagram of a gravity sensor according to an embodiment of the application.

Referring to FIG. 10, FIG. 10 is a structure diagram of a gravity sensor 9051 according to an embodiment of the application. As shown in FIG. 10, a substrate of the gravity sensor 9051 is prepared from silicon dioxide. A first capacitor C1 and a second capacitor C2 are mainly arranged on the substrate. Since capacitance a parallel-plate capacitor is inversely proportional to a distance between plates, the magnitude of the acceleration in an acceleration sensing direction may be calculated by detecting a change in the capacitance. In addition, a spring and a seismic mass are arranged in the acceleration sensing direction and are configured to displace plates of the capacitors under existence of the acceleration and reset the plates of the capacitors when the acceleration is relieved. It can be understood that there are wiring and a bondpad for connecting the capacitors so as to ensure that a capacitance change signal may be transmitted to another device for data processing.

The processor 908 is a control center of the mobile phone. The processor 908 connects each part of the whole mobile phone via various interfaces and lines and executes various functions and data processing of the mobile phone by running or executing the software program and/or module stored in the memory 902 and calling data stored in the memory 902, thereby monitoring the whole mobile phone. Optionally, the processor 908 may include one or more processing units. Preferably, the processor 908 may integrate an application processor and a modulation and demodulation processor. The application processor mainly processes the operating system, a user interface, an application program or the like. The modulation and demodulation processor mainly processes wireless communication. It can be understood that the modulation and demodulation processor may also not be integrated into the processor 908. In the embodiment of the application, the processor 908 may be configured to estimate the falling angle when the electronic device falls to the ground and determine whether the headset plug is a contact point when the electronic device falls to the ground or not according to the falling angle.

In the embodiment of the application, the electronic device 900 further includes a headset jack. The electronic device 900 may be connected with a wired headset through the headset jack and output an audio through the wired headset. The wired headset includes the headset plug. When the electronic device is connected with the wired headset, the headset jack is connected with the headset plug.

Although not shown in the figure, the mobile phone may further include a radio frequency circuit, a Wireless Fidelity (WiFi) module, a Bluetooth module or the like, which will not be elaborated herein.

In the embodiment shown in FIG. 6, each operation of the method flow may be implemented on the basis of the structure of the mobile phone.

In the embodiment shown in FIG. 7, each functional unit may be implemented on the basis of the structure of the mobile phone.

Specifically, the processor 908 may call the computer program stored in the memory 902 to execute the following operations of: monitoring whether the electronic device falls or not; in the case that the electronic device falls, determining whether the headset jack is connected with the headset plug or not; and in the case that the headset jack is connected with the headset plug, controlling a vibration motor to execute a vibration operation to rotate the electronic device by a target angle.

As an example, the processor 908 may call the computer program stored in the memory 902 to further execute the following operations of: estimating the falling angle when the electronic device falls to the ground; and determining whether the headset plug is the contact point when the electronic device falls to the ground or not according to the falling angle.

In controlling the vibration motor to execute the vibration operation to rotate the electronic device by the target angle, the processor 908 may call the computer program stored in the memory 902 to execute the following operation of in the case that the headset plug is the contact point, controlling the vibration motor to execute the vibration operation to rotate the electronic device by the target angle.

As an example, the processor 908 may call the computer program stored in the memory 902 to further execute the following operation of acquiring acceleration information of the electronic device in a falling process.

In estimating the falling angle when the electronic device falls to the ground, the processor 908 may call the computer program stored in the memory 902 to execute the following operation of calculating the falling angle according to the acceleration information.

Thus it can be seen that, with the mobile phone described in FIG. 9, the electronic device may rotate by the target angle when falling in the case that the headset jack of the electronic device is connected with the headset plug to avoid the headset jack to the ground and further prevent the headset jack of the electronic device from being damaged because of falling.

An embodiment of the application further provides a computer storage medium. The computer storage medium stores a computer program configured for electronic data exchange. The computer program enables a computer to execute part or all of the steps of any method recorded in the abovementioned method embodiment. The computer includes a mobile terminal.

An embodiment of the application further provides a computer program product. The computer program product includes a non-transitory computer-readable storage medium storing a computer program. The computer program may be operated to enable a computer to execute part or all of the steps of any method recorded in the abovementioned method embodiment. The computer program product may be a software installation package. The computer includes a mobile terminal.

It is to be noted that, for simple description, each of method embodiments is expressed into a combination of a series of actions. However, those skilled in the art should know that the application is not limited by the order of actions described herein because some steps may be executed in another sequence or at the same time according to the application. In addition, those skilled in the art should also know that the embodiments described in the specification all belong to preferred embodiments and involved actions and modules are not always necessary to the application.

Each of the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic. For example, division of the units is only logic function division, and other division manners may be adopted in practice. For example, multiple units or components may be combined or integrated into another system, or some characteristics may be neglected or not executed. In addition, coupling or direct coupling or communication connection between respective displayed or discussed components may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments in practice.

In addition, each functional unit in each embodiment of the application may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the application substantially or parts making contributions to the conventional art or all or part of the technical solutions may be embodied in form of software product, and the computer software product is stored in a memory, including a plurality of instructions configured to enable a computer device (which may be a personal computer, a server, a network device or the like) to execute all or part of the steps of the method in each embodiment of the application. The abovementioned memory includes various media capable of storing program codes, such as a U disk, a Read-Only Memory (ROM), a RAM, a mobile hard disk, a magnetic disk or an optical disk.

Those of ordinary skill in the art can understand that all or part of the steps in various methods of the embodiments may be completed by related hardware instructed by a program. The program may be stored in a computer-readable memory. The memory may include a flash disk, a ROM, a RAM, a magnetic disk, an optical disk or the like.

The embodiments of the application are introduced above in detail. The principle and implementation modes of the application are elaborated with specific examples in the invention. The descriptions made to the embodiments are only adopted to help the method of the application and the core concept thereof to be understood. In addition, those of ordinary skill in the art may make variations to the specific implementation modes and the application scope according to the concept of the application. From the above, the contents of the specification should not be understood as limits to the application.

The invention claimed is:

1. An electronic device, comprising:
    a sensor, configured to monitor whether the electronic device falls or not;
    a processor, configured to, in the case that the electronic device falls, determine whether a headset jack of the electronic device is connected with a headset plug or not; and a vibration motor, configured to, in the case that the headset jack is connected with the headset plug, execute a vibration operation to rotate the electronic device by a target angle,
wherein the sensor is further configured to:
monitor whether the electronic device is in a weightless state or not; and
in the case that time for which the electronic device is in the weightless state exceeds a preset threshold value, determine that the electronic device falls.

2. The electronic device of claim 1, wherein
the processor is further configured to estimate a falling angle when the electronic device falls to ground and determine whether the headset plug is a contact point when the electronic device falls to the ground or not according to the falling angle; and
the vibration motor is configured to, in the case that the headset plug is the contact point, execute the vibration operation to rotate the electronic device by the target angle.

3. The electronic device of claim 2, wherein
the sensor is further configured to acquire acceleration information of the electronic device in falling; and
the processor is configured to calculate the falling angle according to the acceleration information.

4. The electronic device of claim 3, wherein the acceleration information comprises an acceleration direction, and
wherein the processor is configured to estimate the falling angle when the electronic device falls to the ground according to the acceleration direction.

5. The electronic device of claim 4, further comprising: a memory configured to store the estimated falling angle and an actual falling angle,
wherein the processor is configured to determine whether the target angle for rotation of the electronic device is effective or not according to the estimated falling angle and the actual falling angle and implement correction for calculation of the target angle.

6. The electronic device of claim 2, wherein
the processor is further configured to calculate the target angle according to the falling angle, and
wherein the target angle enables the contact point not to be the headset plug.

7. The electronic device of claim 1, wherein the sensor is at least one of a gravity sensor, an acceleration sensor or a gyroscope.

8. The electronic device of claim 7, wherein the gravity sensor comprises:
a substrate of silicon dioxide,
a first capacitor and a second capacitor arranged on the substrate,
wiring and a bondpad for connecting the first and second capacitors, and
a spring and a seismic mass arranged in a direction of acceleration sensing.

9. The electronic device of claim 1, wherein the vibration motor is an eccentric vibration motor or a linear vibration motor.

10. A method for protecting an electronic device comprising a sensor, a processor, and a vibration motor, the method comprising:
monitoring whether the electronic device falls or not;
in the case that the electronic device falls, determining whether a headset jack of the electronic device is connected with a headset plug or not; and
in the case that the headset jack is connected with the headset plug, controlling the vibration motor to execute a vibration operation to rotate the electronic device by a target angle,
wherein monitoring whether the electronic device falls or not comprises:
monitoring whether the electronic device is in a weightless state or not; and
in the case that time for which the electronic device is in the weightless state exceeds a preset threshold value, determining that the electronic device falls.

11. The method of claim 10, further comprising:
estimating a falling angle when the electronic device falls to ground; and
determining whether the headset plug is a contact point when the electronic device falls to the ground or not according to the falling angle,
wherein controlling the vibration motor to execute the vibration operation to rotate the electronic device by the target angle comprises:
in the case that the headset plug is the contact point, controlling the vibration motor to execute the vibration operation to rotate the electronic device by the target angle.

12. The method of claim 11, further comprising:
acquiring acceleration information of the electronic device in falling,
wherein estimating the falling angle when the electronic device falls to the ground comprises:
calculating the falling angle according to the acceleration information.

13. The method of claim 12, wherein the acceleration information comprises an acceleration direction, and
wherein estimating the falling angle when the electronic device falls to the ground comprises estimating the falling angle when the electronic device falls to the ground according to the acceleration direction.

14. The method of claim 13, further comprising:
storing the estimated falling angle and an actual falling angle, and
determining whether the target angle for rotation of the electronic device is effective or not according to the estimated falling angle and the actual falling angle and implementing correction for calculation of the target angle.

15. The method of claim 11, before controlling the vibration motor to execute the vibration operation, further comprising:
calculating the target angle according to the falling angle,
wherein the target angle enables the contact point not to be the headset plug.

16. The method of claim 10, wherein the sensor is at least one of a gravity sensor, an acceleration sensor or a gyroscope, and
wherein the vibration motor is an eccentric vibration motor or a linear vibration motor.

17. The method of claim 16, wherein the gravity sensor comprises:
a substrate of silicon dioxide,
a first capacitor and a second capacitor arranged on the substrate,
wiring and a bondpad for connecting the first and second capacitors, and
a spring and a seismic mass arranged in a direction of acceleration sensing.

18. A non-transitory computer-readable storage medium, storing a program configured for a computer to execute operations of:
- monitoring whether an electronic device falls or not;
- in the case that the electronic device falls, determining whether a headset jack of the electronic device is connected with a headset plug or not; and
- in the case that the headset jack is connected with the headset plug, controlling a vibration motor of the electronic device to execute a vibration operation to rotate the electronic device by a target angle,
- wherein monitoring whether the electronic device falls or not comprises:
- monitoring whether the electronic device is in a weightless state or not; and
- in the case that time for which the electronic device is in the weightless state exceeds a preset threshold value, determining that the electronic device falls.

* * * * *